F. BRYANT.
POULTRY FEEDING DEVICE.
APPLICATION FILED OCT. 14, 1918.
1,287,867. Patented Dec. 17, 1918.
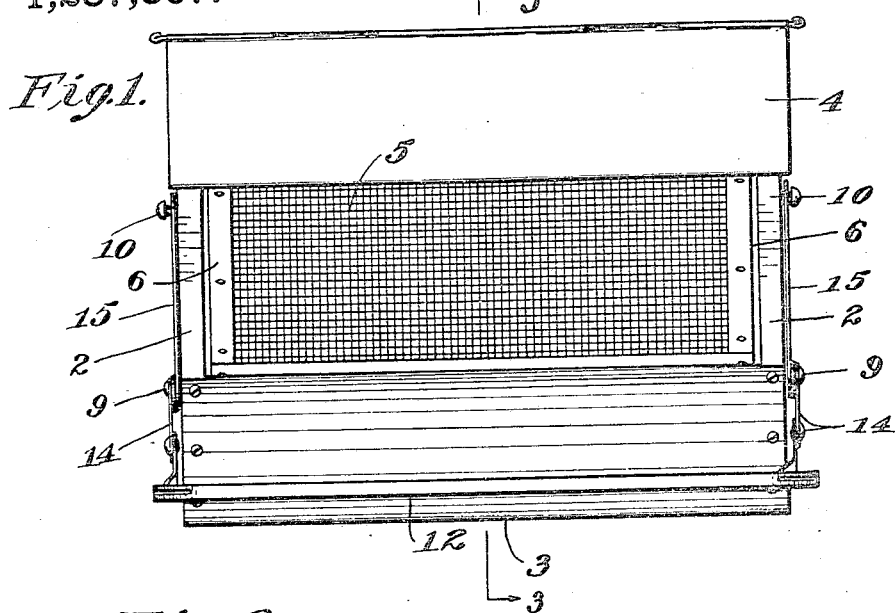
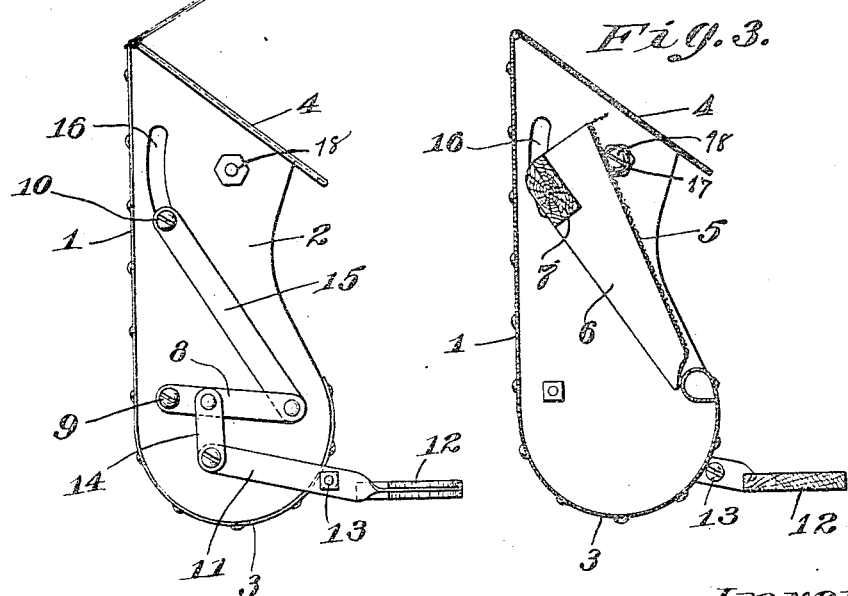
Inventor
Frank Bryant
by Charles W. Hunt
Attorney

UNITED STATES PATENT OFFICE.

FRANK BRYANT, OF STONEHAM, MASSACHUSETTS.

POULTRY-FEEDING DEVICE.

1,287,867.

Specification of Letters Patent.　　Patented Dec. 17, 1918.

Application filed October 14, 1918.　Serial No. 258,042.

*To all whom it may concern:*

Be it known that I, FRANK BRYANT, of Stoneham, in the county of Middlesex and State of Massachusetts, have invented new and useful Improvements in Poultry-Feeding Devices, of which the following is a specification.

My invention relates to poultry feeders, and the object of the invention is to provide a simple and efficient feeder of this character whereby the feed is protected from birds, rats, mice or the like, thereby preventing the loss of the feed.

With this and other objects in view the invention consists in the construction, combination and arrangement of parts as will be hereinafter more fully described, illustrated in the accompanying drawings, and pointed out in the claims hereunto appended.

In the drawings:—Figure 1 is a front elevation of the poultry feeder constructed in accordance with the invention; Fig. 2 is an end elevation of the feeder; Fig. 3 is a vertical section view of the feeder on the line 3 3 of Fig. 1.

Similar numerals refer to similar parts throughout the several views.

Referring to the drawings by numerals the poultry feeder comprises a receptacle having a rear wall 1, end walls 2, a bottom 3 convexed exteriorly and concaved interiorly forming a trough, the said bottom forwardly extending upwardly turning and curling inwardly at the end thereof, forming the lower portion of the front of the receptacle, a hinged top or lid 4 forwardly inclined leaving an opening in the front of the receptacle for a gate or door between said top and said lower portion of the front, a screen gate or door 5 loosely suspended in the upper portion of its side exteriorly of the receptacle at a suitable point adjacent to its side ends and opposite to the wings or projecting pieces hereinafter mentioned by eye-members 17 connected with bolts 18 fixed in the end walls of the receptacle, so that the said gate or door may swing backwardly and forwardly opening and closing the gate or door, the lower end of said gate or door being in contact with the lower front portion of the receptacle, the said gate or door is provided with wings or projecting pieces 6 attached to the side near the ends thereof interiorly of the receptacle, the upper rearward portion of said wings or projecting pieces being connected by a cross piece 7 for strengthening the same for the reception of the screw bolts 10.

Mounted upon the end walls exteriorly thereof are swinging levers 8, the same being supported upon pivots 9 fixed in the end walls, the rear ends of said levers being loosely connected to the said pivots whereby the opposite ends of said levers will swing vertically, the said opposite ends of the levers 8 being connected with the screw bolts 10, by the links 15 loosely connected at each end, the said screw bolts 10 being inserted in the wings or projecting pieces 6 in the upper rearward portion of the sides thereof as desired, and projecting through slots or openings in the side walls 2 without being in contact therewith, so that upon movement of the levers vertically in one direction, the gate or door will swing to open position and on the lowering of the levers the said gate or door will close, the object of the said wings or projecting pieces 6 being to provide means whereby the means of communicating with the levers may be placed a suitable distance from the said gate or door thus aiding in the operation of the levers and the swinging of the gate or door.

Mounted upon the lower or bottom portion of the end walls 2 are the side arms 11, of a tread platform 12 projecting forwardly beyond the front of the receptacle, the said side arms being supported upon pivots 13, the rearward ends of the side arms having links 14 loosely connected thereto, the said links 14 being also loosely connected to the levers 8 intermediate of the ends thereof.

The receptacle is adapted and intended to be attached by any desired means to the wall of a hen-house, or other upright support, any desirable distance above the hen-house floor or ground. Upon a fowl stepping or jumping upon the platform 12 the weight of the fowl will exert a downward pressure upon the platform causing the levers to swing upwardly and thereby open the gate or door 5 so that access may be had to the feed trough through the opening to permit the fowl to pick up the grain or other feed contained within the trough, when the fowl jumps from the platform 12 the weight of gate or door will cause it to gravitate to closed position thereby closing the feed opening of the front of the receptacle, in this manner protecting the feed contained therein from birds, rats, mice, or the like, and preventing them from entering the receptacle and eating and wasting the feed.

It will be readily seen that by suspending the gate or door in the manner described, and shown in the drawings, it will be forwardly inclined, and provide a larger and more direct opening to the feed trough when open, also that the wings or projecting pieces aid the levers in operating the gate or door. The broken line in Fig. 2 shows the top or lid 4 raised, whereby the receptacle being open permits the pouring of grain or other feed therein.

I claim:

1. A poultry feeder comprising a receptacle having a rear wall, end walls, a bottom concaved interiorly of the receptacle forming a trough, a hinged top or lid forwardly inclined, an open front, a screen gate or door adapted to close the open front, the said gate or door being mounted upon the side of the end walls interiorly of the receptacle adjacent to and under the said top or lid, and swingingly suspended upon the upper portion of its side exteriorly of the receptacle by eye members whereby the lower end of said gate or door will swing backwardly and forwardly opening and closing the said opening, the said gate or door being provided with wings or projecting pieces upon the side of the gate or door interiorly of the receptacle and at opposite ends of said side, said wings or projecting pieces being connected through slots or openings in the end walls of the receptacle with levers mounted upon the side of the end walls exteriorly of the receptacle, said levers being connected with the side arms of a tread platform, substantially as described.

2. A poultry feeder comprising a receptacle provided with a bottom concaved interiorly of the receptacle forming a trough, an open front portion, a gate or door adapted to close said opening, wings or projecting pieces attached to the side of said gate or door interiorly of the receptacle and at opposite ends of said side, said gate or door being mounted upon the end walls of the receptacle, and swingingly suspended upon the upper side portion of the gate exteriorly of the receptacle at points opposite the said wings or projecting pieces, substantially as described.

3. A receptacle having an open front portion, a gate or door adapted to close said opening, wings or projections attached to the side of said gate or door interiorly of the receptacle, said wings or projections being connected through slots or openings in the end walls of the receptacle with levers mounted on said end walls exteriorly of the receptacle, substantially as described.

FRANK BRYANT.

Copies of this patent may be obtained for five cents each, by addressing the "Commissioner of Patents Washington, D. C."